United States Patent [19]

Fuller et al.

[11] Patent Number: 4,870,675

[45] Date of Patent: Sep. 26, 1989

[54] REMOTE TESTING OF METALLIC LOOPS WITH A TRANS HYBRID SIGNAL

[75] Inventors: Richard C. Fuller, Fair Haven; Thomas A. Gentles, Freehold; Mark Lewandowski, Aberdeen, all of N.J.

[73] Assignees: American Telephone and Telegraph Company, New York, N.Y.; AT&T Information Systems Inc., Morristown, N.J.

[21] Appl. No.: 276,742

[22] Filed: Nov. 28, 1988

[51] Int. Cl.[4] .................... H04M 1/24; H04M 3/26; H04B 3/46

[52] U.S. Cl. ........................................ 379/5; 309/6; 309/26; 309/27

[58] Field of Search ................. 379/5, 6, 26, 27, 32; 370/15; 371/22

[56] References Cited

U.S. PATENT DOCUMENTS 3,860,769  1/1975  Pachynski .......................... 379/5
4,641,299  2/1987  Kemper et al. ..................... 370/15

OTHER PUBLICATIONS

"Locating Cable Faults", *IEEE Transactions on Industry Applications*, C. A. Maloney, vol. IA-9, No. 4, Jul.-/Aug., 1973, pp. 380-394.

*Primary Examiner*—Stafford D. Schreyer
*Attorney, Agent, or Firm*—Michael A. Morra

[57] ABSTRACT

Currently, metallic loops are tested for shorts, opens and grounds by applying a test signal (DC or 20 Hz) directly to the metallic looop. A test signal cannot be applied to any part of the network other than the metallic loop because it will be blocked by the A-to-D converters and the hybrid of the system before it can reach the metallic loop.

In this invention, digital signal processing is used to test a metallic loop for shorts, opens, grounds and the presence of loading coils from a remote location. Direct metallic connection to the metallic loop is no longer necessary.

Briefly, a test signal, in digital form, is fed into the network at some convenient location remote from the metallic loop that is to be tested. As the signal passes through the A-to-D converter from the digital section of the network to the analog metallic loop, it is converted by the A-to-D converter into an analog signal having a specific frequency and a predetermined amplitude. Defects - opens, shorts and grounds - in the metallic loop cause reflections of the analog test signal. These reflections, as they travel back toward the digital network, are converted by the A-to-D converter into digital form. The reflected signals are then detected, processed and compared to other test signals to determine the presence of shorts, opens, grounds and loading coils in the metallic loop.

8 Claims, 2 Drawing Sheets

REMOTE TESTING OF METALLIC LOOPS WITH A TRANS HYBRID SIGNAL

TECHNICAL FIELD

This invention relates generally, to loop testing systems and, more particularly, to circuitry and associated methodology for detecting a short, an open, a ground, or the presence of loading coils in a metallic loop from a location remote from the metallic path without establishing metallic contact with the metallic loop.

BACKGROUND OF THE INVENTION

In metallic telephone loops, a variety of faults occur from time to time which must be detected, located and repaired. Specifically, these faults can comprise one sided faults or two sided faults. One sided faults are where either the tip or ring of a pair of conductors in a cable is either open or shorted to a ground. Two sided faults are where both the tip and ring of the pair are shorted together or to ground, or they are both open. These faults may result from manufacturing irregularities or, more usually, from physical damage which occurs during cable usage.

The article entitled "Locating Cable Faults", by C.A. Maloney, IEEE Transactions on Industry Applications, July/August 1973, pages 380–394 (particularly pages 385 and 386) is representative of prior art techniques utilized to locate resistive shunt faults. The conventional techniques, and usual variations thereon, employ bridge-type measurements to yield voltage outputs which are a measure of the electrical distance to the fault. With a bridge measurement, craftsperson interaction is required to manipulate bridge controls to effect a balanced bridge condition. Such procedures, while satisfactory for some present day applications such as fault localization activities, are not compatible with the need to reduce the amount of manual work necessary to operate, administer and maintain networks by automating the flow of work from the time a customer reports trouble to the time service is restored.

Specifically, almost half of the cost of each circuit is used in the administration of the equipment, trunk and facilities operations. Clearly, a reduction in the amount of manual work required to test a circuit and improvement in the productivity of field craft personnel will help to reduce these high costs.

SUMMARY OF THE INVENTION

The prior art shortcomings, deficiencies and incompatibilities are obviated, in accordance with the principles of the present invention, by an improved cable testing arrangement, and associated method for remotely detecting opens, shorts, grounds and the presence of loading coils in metallic local loops without requiring direct metallic connection between test equipment and the metallic loop.

Briefly, in this invention, a test signal in digtal form is launched onto a transmission path toward a specific customer destination. The transmission path can be a fiber optic cable, or a radio link or the like. By designating a specific customer destination, a specific metallic loop which is to be tested is automatically identified. After the circuit to the desired metallic loop is established, transmitted digital signals identify the analog signal that is to be generated by the A-to-D converter for transmission along the metallic loop. The analog signal generated by the A-to-D converter has a specific frequency and a predetermined amplitude. It is this analog signal which is the test signal.

The test signal travels along the metallic loop to the customer's premises and, as it travels toward the customer's premises, a discontinuity in the line such as an open, a short, a ground or a loading coil will cause a portion of the test signal to flash back or to be redirected back toward the A-to-D converter.

The flash-back signal, upon reaching the A-to-D converter, is converted into its digital equivalent and, in its digital form, travels back toward the test equipment. It is to be noted that the redirected signal is predominantly of the same frequency as the original test signal but has an amplitude which is less than that of the original test signal. The test apparatus identifies the redirected test signal by its frequency and duration, and records its amplitude and phase relative to the transmitted test signal. The test is repeated a number of times, each successive time being with a test signal of a different frequency. The transmitted test signals and the received flash-back signals are used to determine the condition of the metallic loop.

A comparison of the transmitted test signal and the received redirected signals can be used to characterize the effect on the signal arising from opens, shorts, grounds and/or loading coils. Changes in the condition of the loop can be detected by comparing the data just generated with data which was obtained previously when the metallic loop was known to contain no defects.

DETAILED DESCRIPTION

Figure 1:
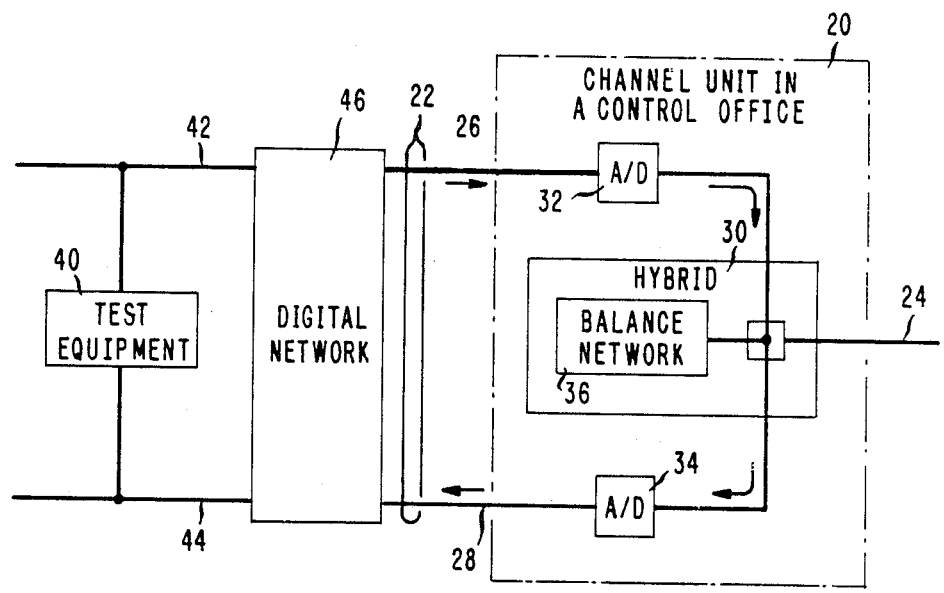
FIG. 1 is a schematic diagram of a network illustrating a channel unit containing a hybrid, A-to-D converters and balance network interposed between a digital transmission line and a metallic loop.

Referring to FIG. 1, there is illustrated a schematic diagram of a network comprising a channel unit 20 which is normally located in a central office and is normally interposed between a digital transmission path 22 and a metallic loop 24.

The digital transmission path 22 can contain two separate paths, one path 26 for transmitting information through the channel unit 20 to the two wire metallic loop 24, and the other path 28 for receiving information from the two wire metallic loop 24 through the channel unit 20.

The channel unit 20 contains a hybrid 30 which coupled the wire metallic loop 24 to the transmitting path 26 and the receiving path 28 of the digital transmission path 22.

An A-to-D converter 32 positioned between the hybrid 30 and the transmit path 26 converts incoming digital signals on the transmit path 26 into analog form for transmission to the metallic loop 24. Another A-to-D converter 34 is positioned between the hybrid 30 and the receive path 28 to convert outgoing analog signals on the metallic loop 24 into digital form for transmission to the receive path 28. It is to be noted that the converters are referred to as A-to-D converters regardless of whether they are used to convert analog signals into digital form or digital signals into analog form. The A-to-D converter, when converting a received digital signal into its analog equivalent, generates an analog signal which has a specific frequency and amplitude for a predetermined interval of time. When going from a received analog signal to the digital signal equivalent, the A-to-D converter generates a digital signal which is representative of the frequency, amplitude and duration of the received analog signal. A balance network 36 located within the hybrid helps reduce echo signals.

The channel unit can normally be located in a central office or in a remote terminal of a Subscriber Loop Carrier system. The receive path 26 and the transmit path 28, as part of a digital network, can be routed to another central office which contains switching equipment, for example, a 5ESS which can be used to complete a communication path between a customer at the far end of the metallic loop 24 to a remote customer located at the far end of the digital transmission line 22. Frequently, the metallic loop 24 must be tested for shorts, opens, grounds and/or loading coils. One common method of testing a metallic loop is to dispatch a craftsperson to the central office which contains the channel unit for the metallic loop that is to be tested. The crafts person locates the desired metallic loop, physically connects the required test equipment to the metallic loop, and then performs the tests required to determine the condition of the loop.

To help expedite the testing of metallic loops, apparatus had been developed which provides mechanized loop testing using a local metallic access port or host telephone switch as disclosed in U.S. Pat. No. 4,641,299. When the distance between a host telephone switch and the ends of telephone loops providing service therefrom exceed a threshold impedance, apparatus to test the loops is located remotely from the host telephone switch. The test apparatus can be located at the host switch or remotely from the host remote switch.

The test apparatus which is located remotely from the host switch obtains access to the telephone loops connected to the remote switch by the use of two applique circuits: one applique circuit being located at the remote switch and the other being located at the host switch. The applique circuits transmit signals between the remotely located test apparatus and a no-test trunk at the host switch in order to establish a connection between the test equipment and the telephone loops.

In the invention here disclosed, a loop can be tested from a remote location without requiring the use of either a host switch or dedicated lines to provide a metallic path between the test equipment and the metallic loop. In our invention, a direct metallic path between the test equipment and the metallic loop is not required.

Returning to FIG.1, test equipment 40 is connected to transmit and receive paths 42,44 of a digital network 46. The digital network can be coupled either directly or through a 5ESS type of switch, to transmit path 26 and receive path 28. As noted previously, transmit path 26 and receive path 28 are coupled through channel unit 20 and metallic loop 24 to a customer's premises. More specifically, the test equipment is connected to transmit and receive time slots that can be mapped through an arbitrary digital network into time slots in the channel back that are associated with the target metallic loop.

The test equipment 40 is conditioned to transmit a signal, in digital form, that identifies the metallic loop that is to be tested. This can be done very simply by identifying the customer connected to the metallic loop 24. Having established a transmission path between the test equipment and the metallic loop which is to be tested, a digital test signal which identifies an analog signal having a preselected frequency and amplitude for a predetermined duration is transmitted by the test equipment.

To test the metallic loop, the digital test signal from the test equipment 40 is launched onto transmit line 42 and carried along the established path through the digital network 46 and central office 20 to the metallic loop 24. In central office 20, the digital signal received by A-to-D converter 32 is converted into an analog signal having a preselected frequency and amplitude for a predetermined duration of time. The analog signal passes through the hybrid 30 and travels along the metallic loop 24. As the analog signal travels along the metallic loop from the hybrid to the customer's premises, it may encounter opens, shorts, grounds and/or loading coils. Each time an open, short, ground and/or a loading coil is encountered, a portion of the analog signal on the metallic loop is flashedback toward the hybrid 30.

The flash-back signal travels back from the open, short, ground and/or loading coil encountered. It travels back along the metallic line 24 to the hybrid 30, and then through A-to-D converter 34 and the digital network to test equipment 40. More specifically, the flash-back signal travels back along the circuit established during the test access. The A-to-D converter converts the analog signal into its digital equivalent. Specifically, the flash-back signal has a predominant frequency which is the same as that of the original signal. But, the amplitude and the phase of the flash-back signal is different from that of the original test signal. During the testing procedure, a portion of the original analog test signal is also received by the balance network 36 located within the hybrid 30. The balance network, which is used to suppress echo, does not fully suppress the flash-back signal. Thus, a portion of the flash-back signal is received by the A-to-D converter where it is converted into its digital equivalent. The flash-back signal, in digital form, is transmitted through the digital network to test equipment.

The original signal transmitted can be represented as $$T = A \sin \omega t$$

where
A is the magnitude of the signal transmitted;
$\omega$ is the frequency of the signal transmitted; and
t is the time that the signal is transmitted.

The flash-back signal, which is received, can be represented as:

$$R = B \sin (\omega t + \theta)$$

which can also be represented as $$B(\sin (\omega t) \cos(\theta) + \cos (\omega t) \sin (\theta))$$

where
B is the magnitude of the flash-back signal;
$\omega$ is the frequency of the flashback signal;
t is the time that the signal is received; and
$\theta$ is the phase difference.

Now, the received signal is synchronously demodulated by multiplying the received signal [$B \sin \omega t + \theta)$]

by the transmitted signal [A sin ωt] and its quadrature [A cos ωt], and the results are low pass filtered (to isolate the the dc component) to provide X and Y as represented below.

(Low Pass Filter) $A (\sin \omega t) (R) = B \cos \theta = X$ where
B is the amplitude of the received signal relative to the original signal; and
sin θ is the phase of the received signal relative to the original signal; and (Low Pass Filter) $(A \cos \omega t) (R) = B (\sin)\theta = Y$ Where
B is the amplitude of the received signal; and
cos θ is the phase of the received signal relative to the original signal.

Now, to separate B (the amplitude) from θ (the phase) the following relationship is used:

$$X^2 + Y^2 = B^2;$$

where
B is the amplitude,
$X/B = \sin \theta$; and
$Y/B = \cos \theta$

Now, the amplitude B is independent of delay; and the phase θ depends on the transit delay of the signal through the digital network and through the analog network which includes the delay through the hybrid and the A-to-D converter. NOTE: delay does not depend upon the frequency of the signal, but it does contribute a term linear in the frequency to the phase because the delay is the derivative of the phase with respect to frequency.

Thus, it can be said that: θ = a constant times the frequency plus a factor which is not linear in frequency.

It is to be noted that the constant contains the delay because the delay is independent of frequency.

The linear phase contribution does not exist in the second difference. Therefore, by designing the testing around second (and higher) order differences, the delay effects are removed and the testing is independent of the access point.

Prior to testing a metallic loop for opens, shorts, grounds and/or the presence of loading coils, a benchmark measurement can be made. thus, upon installation of the metallic loop or at some time thereafter, a test is made of the circuit and the results are recorded. When making the benchmark test, the termination of the circuit should be noted. For example, the termination may be an on-hook (on open) if the termination equipment is a telephone.

Figure 2:
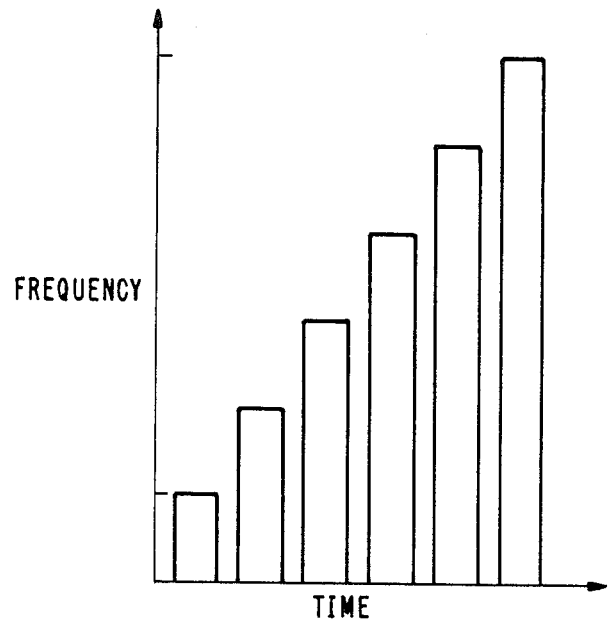
FIG. 2 is graphical representation of the test signals.

The benchmark test can be made using a sequence of single frequency tones. Referring to FIG. 2, for example, a series of tones (for example, 64 different frequencies) starting at 200 Hz and extending to 3400 Hz, each having a duration of one second and a specific amplitude are transmitted by the test equipment 40 in digital form. The signals are converted into analog form by the A-to-D converter 32, and travel along the metallic loop 24. Flash-backs or partial reflections of the series of tones as they travel down the metallic loop are converted by A-to-D converter 34 into digital form, and the flash back information is recorded for future use and reference. It is this benchmark test against which all future tests are compared to determine whether or not defects are present in the metallic loop.

Now, to test a metallic loop, the same series of tones are generated digitally, converted into their analog equivalent by the A-to-D converter and transmitted down the metallic loop. The flash back information is processed and recorded. A comparison of the recently received test results with the benchmark results identifies the existence of opens, shorts, and grounds.

Clearly, by representing analog signal in digital form, the test equipment signals can freely transverse a digital network. The signals are not affected by the transmission media, whether it is fiber optics, T1 carrier or the like, and the signals are not affected by multiplexing, demultiplexing and the like. Thus, for analog signals which are digitably represented, digital transmission from the test equipment to the channel unit and back is loss-less and non-dispersive because only the actual signal values, not the signals themselves, are being transmitted.

Figure 3:
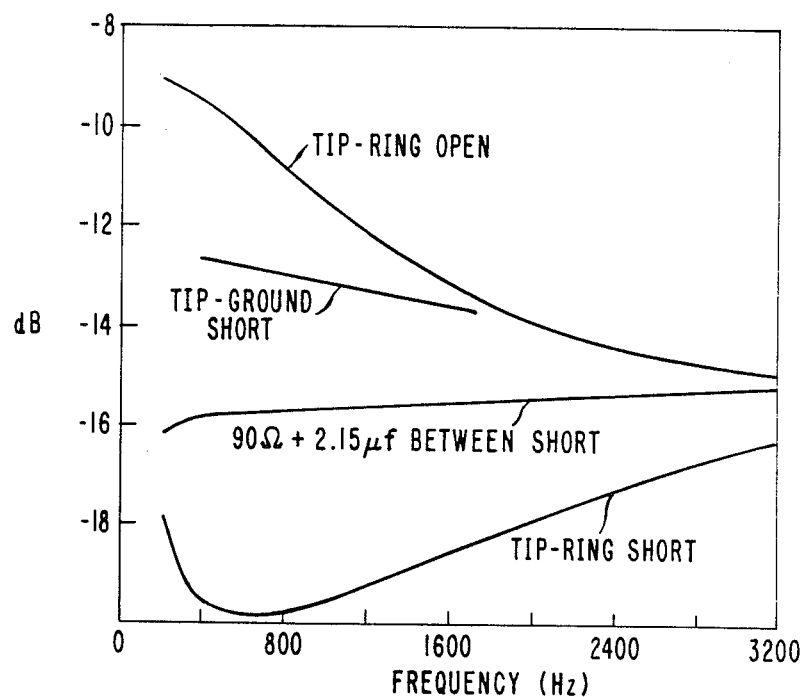
FIG. 3 is graphical representation of tests of a metallic loop.

Referring to FIG. 3, there is a graphical representation of a test of a metallic loop. The top curve represents an open between the tip and ring; the next lower curve represents a short between the tip and ground. Third curve from the top is obtained when the metallic loop is terminated with 900 ohms and 2.15 μf. The bottom curve represents a tip-ring short.

Figure 4:
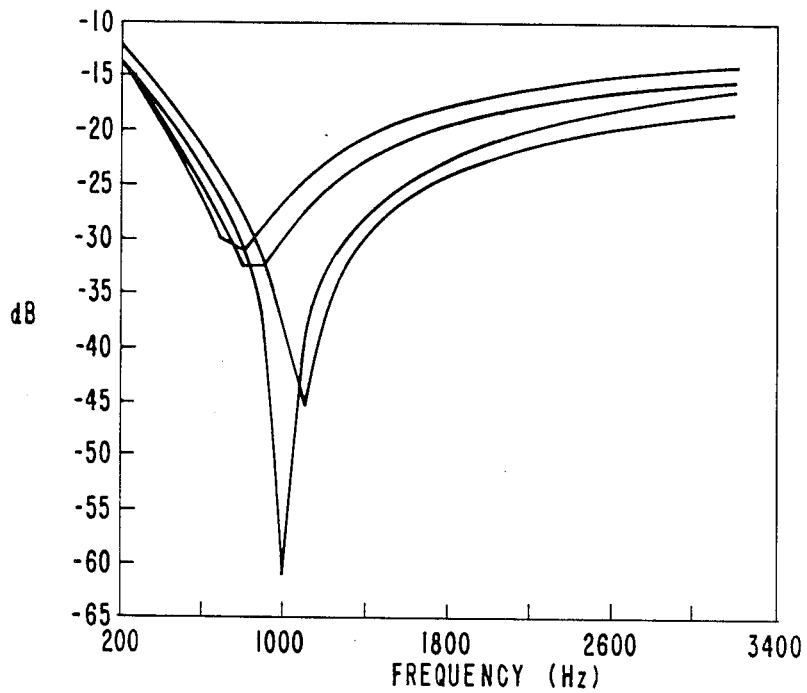
FIG. 4 is another graphical representation of tests of a metallic loop.

FIG. 4 is a graphical representation of a metallic loop having loading coils. The sharp dip at approximately 100 Hz is characteristic of the presence of a loading coil in a metallic loop. The received signal can be processed to identify the remnant zero in the flash back signal that is apparent in the sharp dip. Identification of one or more such remnant zeros is equivalent to load coil detection.

We claim:
1. Test Apparatus
comprising
a two conductor telephone loop for carrying analog signals having one end terminated at a channel unit and the other end teminated at customer equipment,
a digital transmission path for carrying signals in digital form to and from said channel unit,
said channel unit having a hybrid for coupling said two conductor telephone loop to said digital transmission path.
A-to-D converters coupled to convert analog signals going to said digital transmission path from said two conductor telephone loop into digital form, and to convert digital signals going to said two conductor telephone loop from said digital transmission path into analog form, and
test equipment coupled to said digital transmission path, said test equipment comprising test generated means for generating a digital test signal which is converted by the A-to-D converter into an analog signal having a preselected frequency and amplitude for a predetermined interval of time as it travels along the established communication path, test receiving means for receiving the digital equivalent of analog flash-back signals which are caused by the analog test signal encountering discontinuities as it travels toward the terminal equipment end of the two conductor telephone loop and are directed back toward the test equipment along the established communication path, and processing means coupled to determine the changes in amplitude and phase arising from the encountered discontinuity as seen through the hydrid.

2. Test Apparatus of claim 1
wherein the test generator means of said test equipment is adapted to generate a test signal having a frequency up through 200 Hz and 4000 Hz for a specific interval of time at a predetermined amplitude.

3. Test Apparatus of claim 2
wherein said test signal is a series of different frequencies, each having a predetermined duration and specific amplitude.

4. Test Apparatus of claim 3
wherein said series of different frequencies comprise up to 30 discrete frequencies.

5. Test Apparatus of claim 3
wherein said series of different frequencies comprise up to 64 discrete frequencies substantially evenly spaced and each discrete frequency has a preselected duration which can approach one second.

6. The method of testing a two conductor telephone loop
comprising
establishing a communication path through a digital network path through converters adapted to convert digital signals to analog signals and analog signals to digital signals, and through a hybrid for coupling a digital transmission path to a two conductor telephone loop,
sending a digital signal representative of an analog signal having a preselected frequency and amplitude for a predetermined interval of time down said digital transmission path to said telephone loop,
receiving the digital equivalent of analog flash back signals which result from the analog test signal encountering discontinuities as it travels along the telephone loop, and
generating a test result from the signal received.

7. The method of testing a two conductor telephone loop of claim 6 further comprising
comparing the test result obtained with a test result obtained when the telephone loop was known to be free of defects.

8. The method of testing a two conductor telephone loop of claim 6 further comprising
processing the received signal to determine its amplitude and that part of its phase which is not associated with the transit time of the signal through the digital transmission path to the metallic loop.

* * * * *